June 19, 1923.
C. H. PLUMMER
1,459,253
CONVEYING APPARATUS
Filed Nov. 15, 1920
2 Sheets-Sheet 1
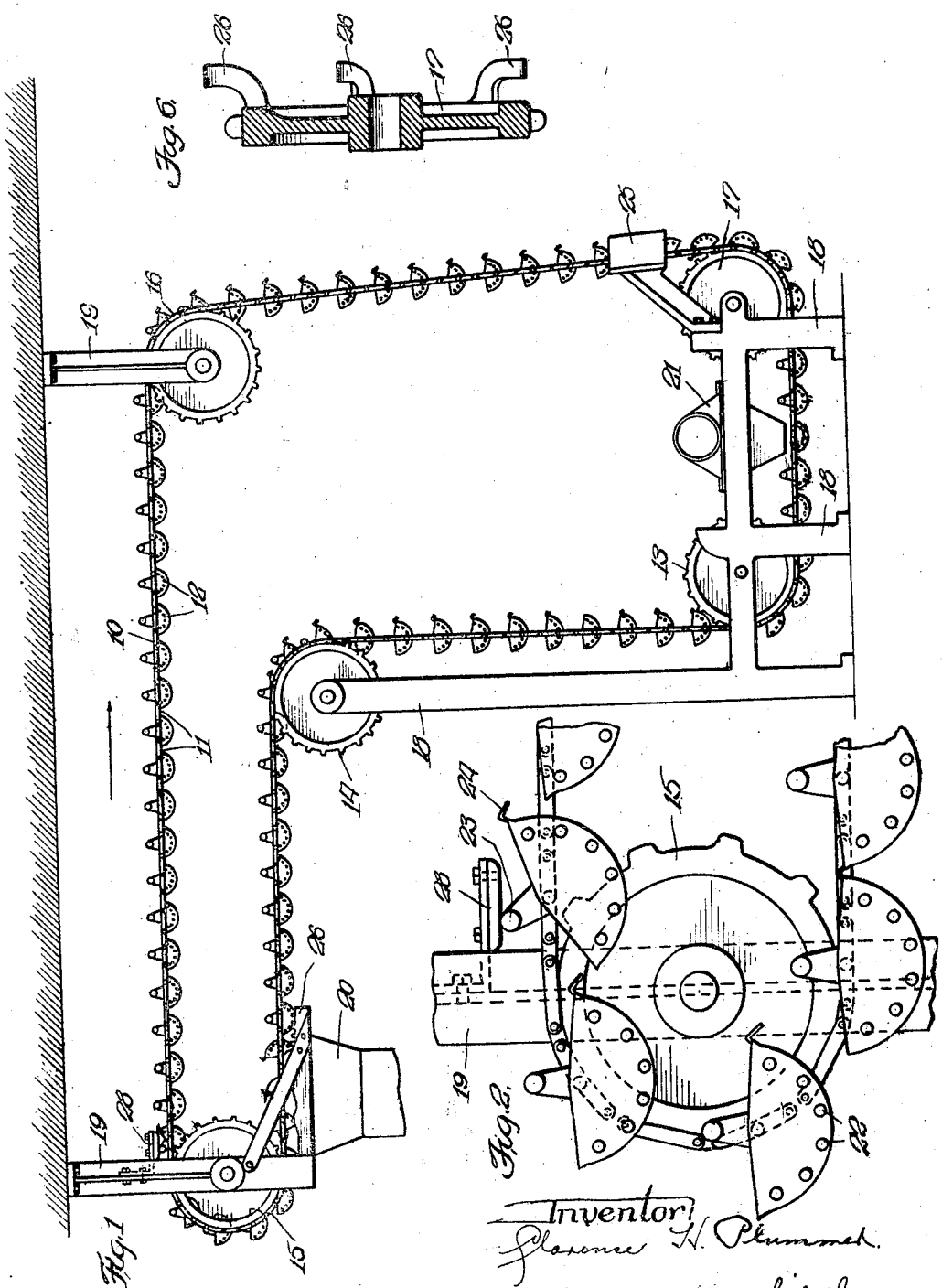

June 19, 1923.
C. H. PLUMMER
1,459,253
CONVEYING APPARATUS
Filed Nov. 15, 1920
2 Sheets-Sheet 2
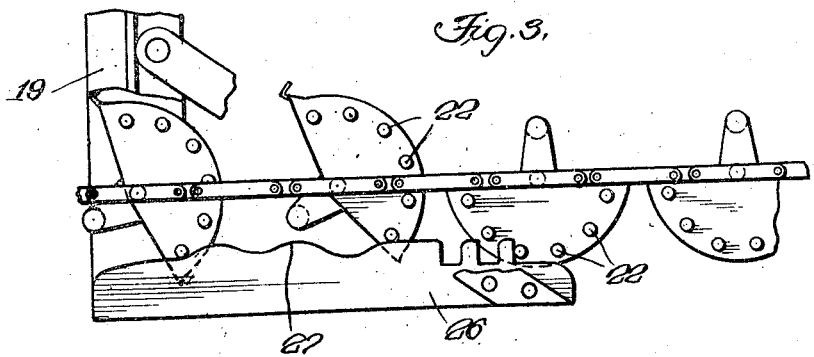
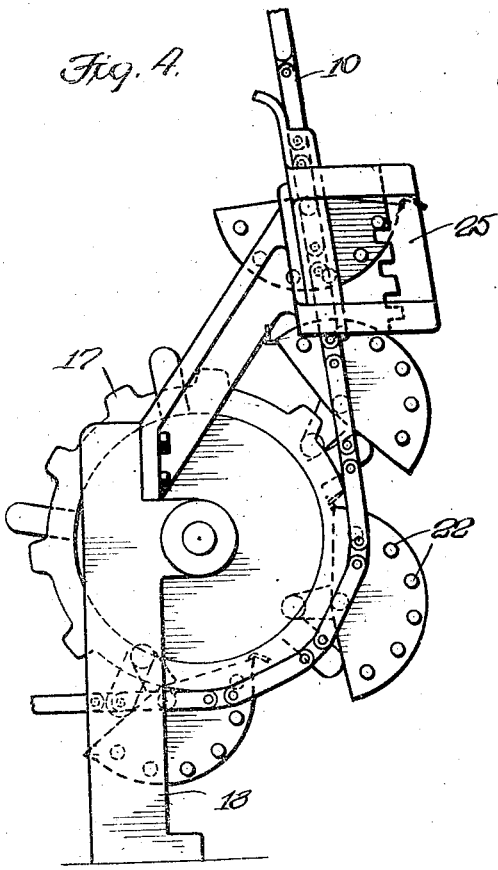
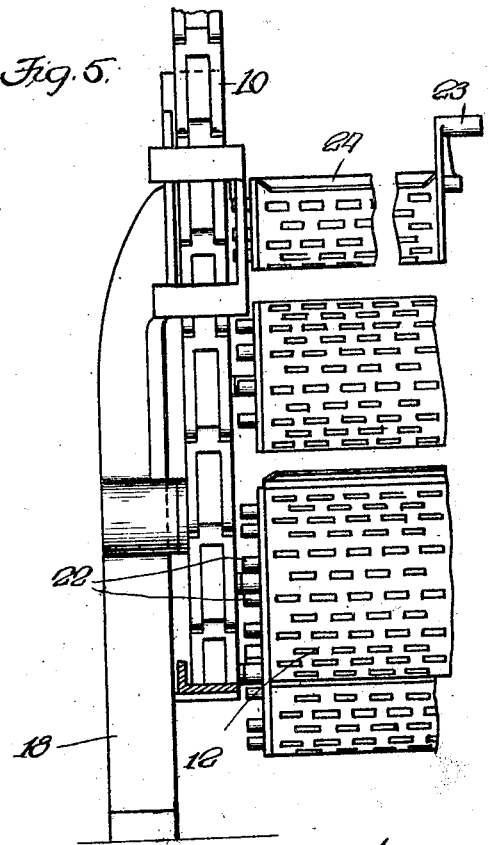
Inventor:
Clarence H. Plummer.
By Jones, Addington, Ames & Seibold
Attys.

Patented June 19, 1923.

1,459,253

UNITED STATES PATENT OFFICE.

CLARENCE H. PLUMMER, OF KEWAUNEE, WISCONSIN.

CONVEYING APPARATUS.

Application filed November 15, 1920. Serial No. 424,030.

*To all whom it may concern:*

Be it known that I, CLARENCE H. PLUMMER, a citizen of the United States, residing at Kewaunee, in the county of Kewaunee and State of Wisconsin, have invented new and useful Improvements in Conveying Apparatus, of which the following is a full, clear, concise, and exact description, reference being had to the accompanying drawing, forming a part of this specification.

My invention relates to conveyor systems and it has particular relation to systems of the character designated in which an endless chain carries a plurality of buckets, the latter having overlapping portions whereby material may be continuously supplied to said conveyor without the possibility of the same being spilled.

One object of my invention is to provide means in a system of the above character whereby the interlocking, overlapping conveyor buckets may be tilted for emptying and thereafter again positively interlocked in overlapping position so as to form an uninterrupted endless bucket chain which may travel past the opening of a filling hopper and receive material therefrom without spilling. By so doing I am able to dispense with most of the measuring and dividing devices which are now so commonly employed with conveyors of this type in order to prevent the spilling which is almost unavoidable when nonoverlapping buckets are used.

In this connection I provide means whereby the conveyor may be used as an elevator and after said buckets have been raised to their highest position they are positively interlocked during their travel towards a delivery means.

In connection with said delivery means I provide a tilting apparatus and associate therewith particular vibrating mechanism which ensures the complete emptying of each of the buckets at the proper point. When the buckets have been emptied and are about to be returned to the filling point, that is, in the assumed illustrative case to a lower point, it may be extremely desirable for them to be again positively interlocked whereby they will be capable of carrying material downwardly, if desired.

The use of the above mentioned means admits of the employment of a chain link which is much shorter than the distance between bucket centers which contributes largely to the desirability of my system.

Referring to the accompanying drawing for a better understanding of my invention:

Fig. 1 is an elevational view of a conveyor system embodying my invention;

Fig. 2 is a fragmentary, elevational view illustrating in detail the manner in which the buckets are positively interlocked after they have been passed the material delivery station;

Fig. 3 is a detail view illustrating the manner in which the buckets are tilted to deliver the material carried therein, and also shows the associated vibrating means;

Fig. 4 is a detail elevational view of the positive interlocking means which are positioned in the system just prior to the point at which the material is supplied to the buckets;

Fig. 5 is a view taken from the right-hand side of Fig. 4; and

Fig. 6 is a sectional, elevational view of the sprocket wheel which is shown in Figs. 4 and 5.

In the hereinafter description, the standards and various other supporting members are, of course, merely illustrative and may be either a few feet or several stories in height.

A conveyor comprises an endless chain 10 consisting of links 11—11, on which are pivoted a plurality of buckets 12—12. Sprocket-like propelling wheels 13, 14, 15, 16 and 17 engage the chain and serve to move it in the direction indicated by the arrow. Suitable standards and hanging devices, such as 18 and 19, support the conveyor. At the upper level of the conveyor a material delivery station 20 is illustratively shown and in a like manner a supply hopper 21 is shown at a lower level. It will be noted that the links are shorter than the distance between bucket centers, whereby an extremely flexible chain is formed. The buckets comprise, as seen, a segmental, cylindrical portion and it is a feature of my invention that the center or axis from which this cylindrical surface is struck is positioned above the point at which the buckets are pivoted.

The buckets are provided with a plurality of pins 22 at one end, and, at their other ends, with upstanding finger-like members 23. Moreover, they are provided at one edge with an overlapping lip 24 which is adapted to fit over and interlock with the adjacent side of the adjoining bucket. Positioned in the path of the conveyor buckets just prior to their approach to the material supply hopper 21 is a rack member 25 of such character that the pins 22 are engaged thereby and the buckets successively tilted into position shown in Fig. 4, as the sprocket 17 engages the chain and pulls said buckets downwardly. On the sprocket 17 are outstanding fingers 26 which engage the sides of the buckets as shown in Fig. 4 and maintain it in a tilted position as it rounds the corner formed by the sprocket 17.

By referring to Fig. 4 it will be seen that the fingers so maintain the buckets that positive overlapping interlocking is ensured when the said buckets leave the sprocket 17 and proceed toward the filling station.

The buckets, after being filled, proceed around the sprocket 13, and are then elevated as shown. Because of the disposition of the sprocket in the manner shown the buckets will again positively interlock as they pass into horizontal position over the sprocket 14.

A rack member 26 is positioned in the path of the conveyor buckets at the material delivery station 20 and so engages the pins 22 (Fig. 3) that the buckets are tilted as shown and their contents are emptied into the delivery hopper. Since it may be desired to convey clinging material in these buckets, I have positioned adjacent the delivery station, a wave-like surface 27 which engages the pins 22 and thereby imparts a considerable vibration to the buckets as they are above the delivery station. Such vibration ensures the shaking out of all the articles from the buckets.

The buckets are then carried around the sprocket 15 in order that they may be returned to the material filling station. Here, however, it is not possible to provide for a positive interlocking of the overlapping lips of the buckets 12 without the employment of particular means.

A member 28 is therefore positioned in the path of the buckets as they leave the upper sprocket 15 (Fig. 2), in such manner that the finger 23 is engaged thereby and the buckets so tipped that as they leave said sprocket, the overlapping portion 24 drops down upon the adjacent edge of the adjoining bucket, and is thereby interlocked therewith.

It will be observed from the above description and the accompanying remarks on the operation of my conveyor system that I have provided means for accomplishing the advantageous objects heretofore set forth and that at all points where the interlocking of the buckets is not insured by reason of the inherent operation of the conveyor, positive means directed to the interlocking of the overlapping portions of the buckets, are provided.

While I have described but one embodiment of my invention it is obvious that many modifications may occur to those skilled in the art and I desire, therefore, that my invention be limited only by the showing of the prior art or by the scope of the appended claims.

Having thus described my invention, what I claim as new and desire to secure by Letters Patent is;

1. In a conveyor system, an endless chain, overlapping buckets carried thereby, a sprocket-like member for propelling said chain, said buckets travelling in unlocked relation toward said member, means for tilting said buckets, and means on said member to hold said buckets in tilted position during their travel thereabout whereby they are positively locked in overlapping relation upon leaving said member.

2. In a conveyor system, an endless chain, overlapping buckets carried thereby having engageable pins thereupon, a sprocket-like member for propelling said chain, said buckets travelling in unlocked relation toward said member, means engaging said pins for tilting said buckets, and a finger on said member to hold said buckets in tilted position during their travel thereabout whereby they are positively locked in overlapping relation upon leaving said member.

3. In a conveyor system, an endless chain, overlapping buckets carried thereby, means for delivering material to said buckets, receiving means for said material, a plurality of propelling members for said chain, means for insuring the positive locking of said buckets prior to their passing said delivery means, means comprising a rack cooperating with some of said engageable members for tilting said buckets to empty the same, and means comprising an irregular surface with which said members engage whereby said buckets are vibrated and all the material dislodged therefrom.

4. In a conveyor system, an endless chain, overlapping buckets carried thereby, means for delivering material to said buckets, receiving means for said material, a plurality of propelling members for said chain, means for insuring the positive locking of said buckets prior to their passing said delivery means, means comprising a rack cooperating with some of said engageable members for tilting said buckets to empty the same, and means comprising a wave-like surface positioned adjacent said rack with which said members engage whereby said buckets are vibrated and all the material dislodged therefrom.

5. In a conveyor system, an endless chain and a plurality of overlapping buckets carried thereby, propelling means for said conveyor, some of which are so positioned that said buckets maintain their positive interlocked relation when passing thereabout, and means associated with the remainder of said propelling means to insure a positive interlocking of said overlapping buckets.

6. In a conveyor system, a conveyor comprising a chain and overlapping buckets pivotally mounted thereupon, propelling means whereby said chain and buckets may be lifted from one level to another, some of said propelling means being so disposed that said buckets inherently maintain their interlocked position during their passage thereover, and means whereby the buckets upon the passage over the others of said propelling means are so moved as to resume their positive interlocking relation.

In witness whereof, I have hereunto subscribed my name.

CLARENCE H. PLUMMER.